US008601587B1

(12) United States Patent
Powell et al.

(10) Patent No.: US 8,601,587 B1
(45) Date of Patent: Dec. 3, 2013

(54) SYSTEM, METHOD, AND SOFTWARE FOR CYBER THREAT ANALYSIS

(75) Inventors: William S. Powell, Gibsonton, FL (US); Thomas L. Chen, Seminole, FL (US)

(73) Assignee: Raytheon Company, Waltham, MA (US)

( * ) Notice: Subject to any disclaimer, the term of this patent is extended or adjusted under 35 U.S.C. 154(b) by 213 days.

(21) Appl. No.: 12/875,854

(22) Filed: Sep. 3, 2010

Related U.S. Application Data

(60) Provisional application No. 61/240,046, filed on Sep. 4, 2009.

(51) Int. Cl.
G06F 11/00 (2006.01)
G06F 12/14 (2006.01)
G06F 12/16 (2006.01)
G08B 23/00 (2006.01)

(52) U.S. Cl.
USPC .......................................................... 726/25

(58) Field of Classification Search
USPC .......................................................... 726/25
See application file for complete search history.

(56) References Cited

U.S. PATENT DOCUMENTS

| | | | |
|---|---|---|---|
| 4,980,927 A | 1/1991 | Wawiluk et al. ..................... 2/60 |
| 6,901,346 B2 | 5/2005 | Tracy et al. .................... 702/181 |
| 6,980,927 B2 | 12/2005 | Tracy et al. .................... 702/181 |
| 6,983,221 B2 | 1/2006 | Tracy et al. .................... 702/181 |
| 6,993,448 B2 | 1/2006 | Tracy et al. .................... 702/119 |
| 7,330,841 B2 | 2/2008 | Cochran et al. ................. 706/45 |
| 7,380,270 B2 | 5/2008 | Tracy et al. ....................... 726/3 |
| 7,530,105 B2 | 5/2009 | Gilbert et al. .................... 726/22 |
| 7,761,918 B2 | 7/2010 | Gula et al. ........................ 726/23 |
| 7,890,869 B1 | 2/2011 | Mayer et al. ................... 715/736 |
| 7,926,113 B1 | 4/2011 | Gula et al. ........................ 726/25 |
| 7,930,256 B2 | 4/2011 | Gonsalves et al. .............. 706/11 |
| 7,934,253 B2 | 4/2011 | Overcash et al. ............... 726/22 |
| 2005/0033710 A1 | 2/2005 | Cochran et al. ................. 706/45 |
| 2005/0138413 A1* | 6/2005 | Lippmann et al. ............ 713/201 |
| 2005/0172155 A1 | 8/2005 | Sheymov ....................... 713/201 |
| 2005/0193430 A1* | 9/2005 | Cohen et al. ..................... 726/25 |
| 2006/0021048 A1* | 1/2006 | Cook et al. ....................... 726/25 |
| 2006/0212932 A1 | 9/2006 | Patrick et al. ................... 726/11 |

(Continued)

OTHER PUBLICATIONS

IANS, "Leveraging Tenable Network Security to Create a True Vulnerability Management Program", IANS Working Knowledge Series Case Study (5 pgs), Spring 2010.

(Continued)

Primary Examiner — Philip Chea
Assistant Examiner — Trong Nguyen
(74) Attorney, Agent, or Firm — Schwegman, Lundberg & Woessner, P.A.

(57) ABSTRACT

According to certain embodiments, a cyber threat analysis system generates a network model of a network infrastructure that is used by an organization, assigns a weighting value to each of a plurality of network elements of the network infrastructure according to a relative importance of the each network element to the organization, and generates an attack vector according to a determined vulnerability of the network infrastructure. The attack vector represents one or more illicit actions that may be performed to compromise the network infrastructure. The system may simulate, using a network modeling tool, the attack vector on the network model to determine one or more resulting ramifications of one or more of the plurality of network elements due to the attack vector, and determine a criticality level of the attack vector according to the weighting value of the one or more network elements.

23 Claims, 3 Drawing Sheets

(56) References Cited

U.S. PATENT DOCUMENTS

| | | | | |
|---|---|---|---|---|
| 2007/0162754 | A1 | 7/2007 | Sheymov | 713/172 |
| 2007/0226796 | A1 | 9/2007 | Gilbert et al. | 726/22 |
| 2007/0283441 | A1* | 12/2007 | Cole et al. | 726/25 |
| 2008/0010225 | A1 | 1/2008 | Gonsalves et al. | 706/11 |
| 2008/0034424 | A1 | 2/2008 | Overcash et al. | 726/22 |
| 2009/0307772 | A1 | 12/2009 | Markham et al. | 726/22 |
| 2010/0042513 | A1 | 2/2010 | Sheymov | 705/27 |
| 2010/0115280 | A1 | 5/2010 | Sheymov | 713/172 |
| 2010/0138925 | A1* | 6/2010 | Barai et al. | 726/25 |
| 2010/0319069 | A1 | 12/2010 | Granstedt et al. | 726/22 |
| 2010/0325412 | A1* | 12/2010 | Norrman et al. | 713/100 |
| 2011/0126111 | A1 | 5/2011 | Gill et al. | 715/736 |
| 2011/0185055 | A1 | 7/2011 | Nappier et al. | 709/224 |
| 2011/0185431 | A1 | 7/2011 | Deraison | 726/25 |
| 2011/0231935 | A1 | 9/2011 | Gula et al. | 726/25 |
| 2011/0264608 | A1 | 10/2011 | Gonsalves et al. | 706/10 |
| 2011/0277034 | A1 | 11/2011 | Hanson | 726/25 |

OTHER PUBLICATIONS

Tenable Network Security, "Web Application Scanning with Nessus—Detecting Web Application Vulnerabilities and Environmental Weaknesses" (Revision 3) (14 pgs), Sep. 2, 2010.

Tenable Network Security, "Using Nessus in Web Application Vulnerability Assessments" (39 pgs), Jul. 15, 2009.

Tenable Network Security, "Maximizing ROI on Vulnerability Management" (Revision 1) (25 pgs), Mar. 16, 2009.

Tenable Network Security, "Organizational 'Return on Investment' Using Tenable Products" (revision 4) (12 pgs), May 19, 2011.

Tenable Network Security, "Unified Security Monitoring (USM)—Real-Time Situational Awareness of Network Vulnerabilities, Events and Configurations" (Revision 2) (12 pgs), Jan. 27, 2009.

"Skybox Security Launches Skybox View® 5.0 Solution—Enhancing Cyber Security Capabilities for Business and Government", http://www.skyboxsecurity.com/new-events/press-release/Skybox-launches-Skybox-Vie . . . (1 pg), Jun. 22, 2010.

"Skybox Security Announces Introduction of Skybox 4000 Appliance—Extends enterprise deployment options for Skybox View security risk and compliance management suite", http://www.skyboxsecurity.com/news%2526events/press%20releases/skybox-security-an . . . (1 pg), Mar. 1, 2010.

Skybox Security, "Automated Security Analysis—Learning to Love Change", http://www.skyboxsecurity.com/resources/articles/automated-security-analysis-%E2%80 . . . (2 pg), Jun. 2010.

Skybox Security, "Policing Your IT Police—Proactive Security", http://www.skyboxsecurity.com/resources/articles/policing-your-it-police-%E2%80%93- . . . (2 pg), Feb. 2010.

"Skybox View 4.0 Security Risk Management Platform", http://www.scmagazineus.com/skybox-view-40-security-risk-management-platform/print . . . (3 pgs), Jun. 18, 2008.

Techworld—"Skybox View Assure and Skybox View Secure review", Categorise and quantify risk by Rob Smithers, Network World US, http://review.techworld.com/security/3230391/skybox-view-assure-and-skybox-view-sec . . . (2 pgs), Jul. 12, 2010.

Red Seal Systems Inc., "RedSeal Systems Network Advisor v4.1 & Vulnerability Advisor v4.1", http://www.scmagazineus.com/redseal-systems-network-advisor-v41--vulnerability-advis . . . , May 18, 2010.

Steven Noel, et al., "Advances in Topological Vulnerability Analysis", (6 pgs), Mar. 2009.

Project Remedies, Inc., "The SARMM Solution: Situational Awareness, Risk Management and Mitigation System", (10 pgs), Aug. 27, 2010.

Xacta IA Manager, "IT governance, risk management and compliance through advanced security process automation", (8 pgs), Identified as © 2009.

Telos, "Xacta IA Manager™ Automating Compliance for Security Operations", (8 pgs), Identified as © 2007.

i2 Analyst's Notebook Review—SC Magazine US, "i2 Analyst's Notebook", http://www.scmagazineus.com/i2-analysts-notebook/printreview/459/ (2 pgs), Jul. 11, 2006.

W.Y. Wang, et al., "NCTUNS 4.0: An Integrated Simulation Platform for Vehicular Traffic, Communication, and Network Researches", 1st IEEE WiVec 2007, (6 pgs), Sep. 30, 2007.

* cited by examiner

SYSTEM, METHOD, AND SOFTWARE FOR CYBER THREAT ANALYSIS

RELATED APPLICATIONS

This application claims the benefit under 35 U.S.C. §119 (e) of the priority of U.S. Provisional Patent Application Ser. No. 61/240,046, entitled "Cyber Threat Prediction Method," filed Sep. 4, 2009, the entire disclosure of which is hereby incorporated by reference.

TECHNICAL FIELD OF THE DISCLOSURE

This disclosure generally relates to computer systems, and more particularly, to a system, method, and software for cyber threat analysis.

BACKGROUND

Computer security is a technology associated with information security of computer networks. The objective of computer security includes protection of information and property from theft, corruption, or natural disaster, while allowing the information and property to remain accessible and productive to its intended users.

SUMMARY

According to certain embodiments, a cyber threat analysis system generates a network model of a network infrastructure that is used by an organization, assigns a weighting value to each of a plurality of network elements of the network infrastructure according to a relative importance of the each network element to the organization, and generates an attack vector according to a determined vulnerability of the network infrastructure. The attack vector represents one or more illicit actions that may be performed to compromise the network infrastructure. The system may simulate, using a network modeling tool, the attack vector on the network model to determine one or more resulting ramifications of one or more of the plurality of network elements due to the attack vector, and determine a criticality level of the attack vector according to the weighting value of the one or more network elements.

Certain embodiments of the present disclosure may provide one or more technical advantages. Embodiments of the present disclosure may provide techniques for identifying and assessing criticalities associated with of cyber threats to an organization, or possibly mitigating the adverse effects of those cyber threats to an organization that uses an analyzed network infrastructure. Given the nature of many network infrastructures, providing absolute security for the network infrastructures is often difficult, if not impossible to attain. In many cases, this may be due to the relatively complex nature of many network infrastructures that are used and managed by relatively large groups of people. The configuration of these large network infrastructures may be altered on a frequent basis such that vulnerabilities may be inadvertently created from which cyber attacks may be launched.

Certain embodiments of the present disclosure provide a system for assigning criticality values with identified cyber attack vectors such that those cyber attacks having the largest impact upon the organization may be identified and remediated in an efficient manner. For example, certain embodiments of the cyber threat analysis system may provide cost savings and avoidance through prioritizing the remediation of vulnerabilities. As such, the cyber threat analysis system may provide cost factors to certain types of cyber threats to justify the expenditures used for remediation of detected vulnerabilities. Thus, certain embodiments of the cyber threat analysis system may empower customers to reduce network security development cycles, establish good network security practices, and/or increase overall network security states. For example, a particular network infrastructure may include a sub-network incorporating services for providing financial management for payments and/or receipts for services rendered or products provided by service personnel and/or customers, respectively. Criticality values determined by the cyber threat analysis tool may be used to determine an estimated downtime, and/or other factors associated with restoring operation of the sub-network that manages financial services from which an estimated monetary cost to the organization due to a cyber attack may be determined.

Certain embodiments of the present invention may provide some, all, or none of the above advantages. Certain embodiments may provide one or more other technical advantages, one or more of which may be readily apparent to those skilled in the art from the figures, descriptions, and claims included herein.

BRIEF DESCRIPTION OF THE DRAWINGS

To provide a more complete understanding of the present invention and the features and advantages thereof, reference is made to the following description taken in conjunction with the accompanying drawings, in which.

DESCRIPTION OF EXAMPLE EMBODIMENTS

Figure 1:
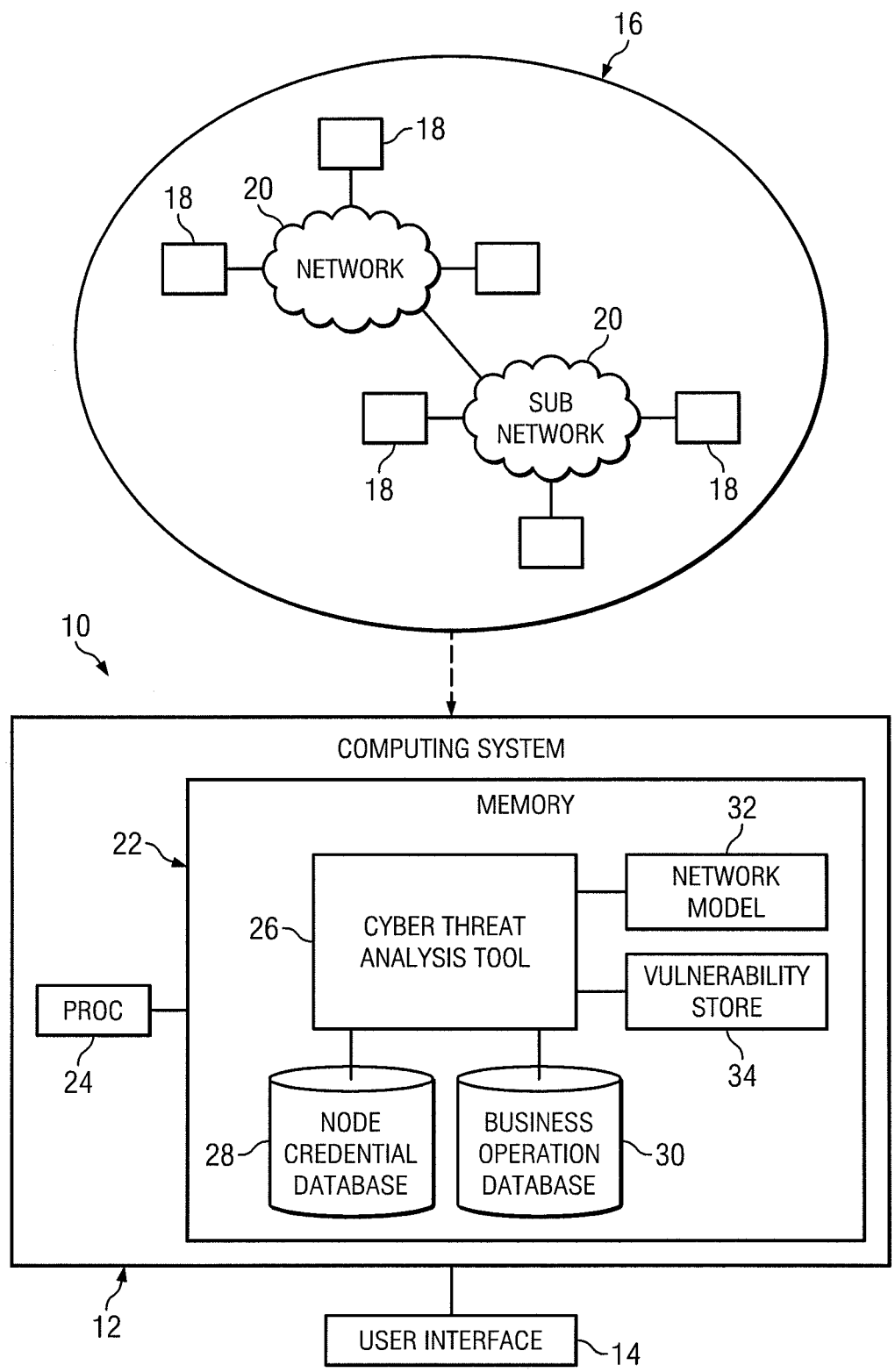
FIG. 1 illustrates an example cyber threat analysis system according to certain embodiments of the present disclosure.

FIG. 1 illustrates an example cyber threat analysis system 10 according to certain embodiments of the present disclosure. Cyber threat analysis system 10 includes a computing system 12 in communication with a user interface 14 and a network infrastructure 16 to be analyzed. Computing system 12 includes a memory 22 and a processor 24 for executing a cyber threat analysis tool 26. Memory 22 may also stores a node credential database 28, a business operations database 30, a network model 32, and a vulnerability store 34. As described in detail below, cyber threat analysis tool 26 generates cyber attack vectors that may be performed on network infrastructure 16, and determines a criticality for the cyber attack vectors according to a relative importance of certain network elements that may be affected by the corresponding cyber attack vectors.

Network infrastructure 16 includes one or more network elements 18 communicatively coupled via one or more networks 20. Network infrastructure 16 may include any type and quantity of network elements 18. Examples of network elements 18 may include workstations, data servers, application servers, data guards, firewalls, content filters, mail routers, gateways, bridges, hubs, or other computing devices that access and/or provide services available through network infrastructure 16. Network 20 facilitates wireless or wireline communication, and may communicate, for example, IP packets, Frame Relay frames, Asynchronous Transfer Mode (ATM) cells, voice, video, data, and other suitable information between network addresses. Network 16 may include one or more LANs, radio access networks (RANs), metropolitan area networks (MANs), WANs, all or a portion of the global network infrastructure known as the Internet, and/or any other communication system or systems at one or more locations.

Cyber threats are a problem common to most modern networks and the organizations that manage/use them. Vulnerability assessment tools may be used to identify these vulnerabilities, but provide no perspective reflecting the true severity of the security issues identified. As a result, remediation efforts focus on blanket approaches to patch and harden vulnerabilities without respect to any actual potential that those vulnerabilities can even be exploited. Remediation in this manner has generally been a relatively inefficient use of resources. Methodologies and network security modeling and simulation tools used to address this challenge represent an evolution of vulnerability analysis that is often difficult, time consuming, and generally overlooked using traditional vulnerability assessment tools alone.

In general, certain embodiments of the present disclosure provide techniques for simulating cyber attacks on a network model 32 of network infrastructure 16 to determine criticalities associated with each cyber attack. A criticality generally refers to a measure of the level of impact to an organization that uses network infrastructure 16 due the cyber attack. A cyber attack that causes a relatively large level of adverse impact, therefore, may be assigned with a relatively high criticality level, while a cyber attack causing a relatively lower impact to the organization may be assigned with a relatively lower criticality level.

Certain embodiments of the present disclosure may provide one or more technical advantages. Embodiments of the present disclosure may provide techniques for identifying and assessing criticalities associated with of cyber threats to an organization, or possibly mitigating the adverse effects of those cyber threats to an organization that uses an analyzed network infrastructure 16. Given the nature of many network infrastructures, providing absolute security for the network infrastructures is often difficult, if not impossible to attain. In many cases, this may be due to the relatively complex nature of many network infrastructures 16 that are used and managed by relatively large groups of people. The configuration of these large network infrastructures may be altered on a frequent basis such that vulnerabilities may be inadvertently created from which cyber attacks may be launched.

Certain embodiments of the present disclosure provide a system for assigning criticality values with identified cyber attack vectors such that those cyber attacks having the largest impact upon the organization may be identified and remediated in an efficient manner. For example, certain embodiments of the cyber threat analysis system 10 may provide cost savings and avoidance through prioritizing the remediation of vulnerabilities. As such, the cyber threat analysis system 10 may provide cost factors to certain types of cyber threats to justify the expenditures used for remediation of detected vulnerabilities. Thus, certain embodiments of the cyber threat analysis system may empower customers to reduce network security development cycles, establish good network security practices, and/or increase overall network security states.

Cyber attack vectors generally represent one or more illicit actions that may be performed on network infrastructure 16. In other words, cyber attack vectors may include physical and associated logical paths that may be taken through network infrastructure 16 to reach its target. Illicit actions may include those that exploit external vulnerabilities, internal vulnerabilities, or cascading vulnerabilities of network infrastructure 16. Cyber threat analysis tool 26 generates cyber attack vectors associated with network infrastructure 16 and stores the cyber attack vectors in vulnerability store 34.

External vulnerabilities generally refer to a susceptibility of network infrastructure 16 to direct cyber attacks. Examples of direct cyber attacks may include, for example, hacking attempts to access proprietary information stored in network infrastructure 16, and/or damage or otherwise disable processes or services provided by network infrastructure 16. Typically, direct cyber attacks exploit vulnerabilities through perimeter network elements of network infrastructure 16, such as gateways, edge routers, wireless access points, or other types of network elements that are communicatively coupled to other computing systems outside of network infrastructure 16.

Internal vulnerabilities generally refer to susceptibilities of network infrastructure 16 that are created by actions of personnel who may use network infrastructure 16. An example of an internal vulnerability may include susceptibility to a phishing attack in which a user may inadvertently provide a logical path for a cyber attack to intrude network infrastructure 16. Another example of an internal vulnerability may include a susceptibility to Trojans that may be inadvertently installed by a user on a particular network element of network infrastructure 16.

Cascading vulnerabilities generally refer to a susceptibility of certain network elements of network infrastructure 16 to the ill-effects generated by either external vulnerabilities or internal vulnerabilities. In many cases, cyber attacks may adversely affect multiple network elements once intrusion has been gained into an initial network element. For example, network infrastructure 16 may include a sub-network to which multiple network elements are coupled for performing their assigned purpose. A particular cyber attack that generates a denial-of-service attack of routers or other network administrative function for the sub-network may also have the effect of disabling other network elements coupled to the sub-network. Thus, cascading vulnerabilities may include not only those network elements that are directly susceptible to cyber attack, but also those network elements that may be affected by successful cyber attacks on other network elements in network infrastructure 16.

Cyber threat analysis tool 26 generates cyber attack vectors according to a network model 32 that represents the actual network infrastructure 16. Network model 32 generally refers to a logical representation of the actual network infrastructure 16 that may be stored in memory 22. In certain embodiments, network model 32 may incorporate a link-node format in which network elements of network infrastructure 16 are represented as nodes and their associations with one another are represented by links.

Cyber threat analysis tool 26 may perform a discovery operation to find network elements (nodes) in network infrastructure 16 and determine associations (links) among them. In certain embodiments, cyber threat analysis tool 26 may perform a discovery operation using publicly exposed interfaces to network infrastructure 16 to determine external vulnerabilities that may be associated with network infrastructure 16. In certain embodiments, cyber threat analysis tool 26 may receive credential information from node credential database 28 to generate network model 32.

Node credential database 28 stores information associated with administrative privileges of certain network elements 18 of network infrastructure 16. Cyber threat analysis tool 26 uses credential information to identify underlying links between network elements 18 and configuration parameters of network elements 18 that may not otherwise be provided for generating network model 32. For example, node credential database 28 may include administrative privileges for a particular sub-network of network infrastructure 16 whose configuration is hidden from public access in which the configuration of this sub-network may include write privileges for certain applications executed on network elements 18. Although not publicly exposed, these write privileges may create internal vulnerabilities that may have an impact upon services provided by network infrastructure 16. Thus, use of whose credential information may enable cyber threat analysis tool 26 to determine internal vulnerabilities and/or generate a relatively complete network model 32 of network infrastructure 16.

Cyber threat analysis tool 26 generates cyber attack vectors from identified vulnerabilities and stores the generated cyber attack vectors in vulnerability store 34. Each cyber attack vector generally includes one or more physical and logical paths that may be taken through network infrastructure 16. For example, a cyber attack vector may include information associated with a suspected vulnerability in which a particular operation is conducted on a certain application executed on a certain operating system to use a certain service over a certain port. Vulnerability store 34 may store one or many such vulnerabilities from which criticality values may be determined.

Computing system 12 includes one or more processing units 24 and one or more memory units 22. A processing unit as described herein may include one or more microprocessors, controllers, or any other suitable computing devices or resources and may work, either alone or with other components of cyber threat analysis system 10, to provide a portion or all of the functionality of cyber threat analysis system 10 described herein. A memory unit 22 as described herein may take the form of volatile and/or non-volatile memory including, without limitation, magnetic media, optical media, random access memory (RAM), read-only memory (ROM), removable media, or any other suitable memory component. A portion or all of memory units 22 may be remote from computing system 12, if appropriate. Memory unit 22 may store a cyber threat analysis tool 26, node credential database 28, business operations database 30, network model 32, and vulnerability store 34. The available resources may include resources provided by computing systems 12 that may be used by user interface 14.

Computing system 12 may include a cyber threat analysis tool 26 that is operable to determine maneuvers for computing elements of network infrastructure 16. Cyber threat analysis tool 26 may be implemented in any suitable combination of hardware, firmware, and software. Additionally, cyber threat analysis tool 26 may be implemented in a single location or in a distributed fashion (e.g., such that certain functions described with respect to cyber threat analysis tool 26 are provided on a system other than computing system 12), according to particular needs.

Embodiments of cyber threat analysis tool 26 may include logic contained within a medium. Logic may include hardware, software, and/or other logic. The medium in which the logic is encoded may include a tangible medium. The logic may perform operations when executed by processor 24. Certain logic may include a computer program, software, computer executable instructions, and/or instructions capable being executed by computing system 12. The logic may also be embedded within any other suitable medium without departing from the scope of the disclosure.

User interface 14 may communicate with computing system 12 to alternatively display data and/or execute applications on computing system 12. User interface 14 may include a display, such as a cathode ray tube (CRT) or a liquid crystal display (LCD) for displaying criticalities and/or other suitable results generated by cyber threat analysis tool 26. User interface 14 may include a keyboard, a mouse, a console button, or other type of user input device for inputting information to cyber threat analysis tool 16.

The components of cyber threat analysis system 10 may be implemented using any suitable combination of software, firmware, and hardware. These components may be implemented using one or more computer systems at one or more locations. Each computer system may include any appropriate input devices, output devices, mass storage media, processors, memory, or other suitable components for receiving, processing, storing, and communicating data. For example, each computer system may include a personal computer, workstation, network computer, kiosk, wireless data port, personal data assistant (PDA), one or more Internet Protocol (IP) telephones, one or more servers, a server pool, one or more processors within these or other devices, or any other suitable processing device.

Each computer system of cyber threat analysis system 10 may include one or more processing modules and one or more memory modules. A processing module may include one or more microprocessors, controllers, or any other suitable computing devices or resources. Processing modules may work, either alone or with other components of system 10, to provide the functionality of system 10 described herein. Each memory module may take the form of volatile or non-volatile memory including, without limitation, magnetic media, optical media, RAM, ROM, removable media, or any other suitable memory component.

Components of cyber threat analysis system 10 may be communicatively coupled via a network. The network may facilitate wireless or wireline communication, and may communicate, for example, IP packets, Frame Relay frames, Asynchronous Transfer Mode (ATM) cells, voice, video, data, and other suitable information between network addresses. The network may also include one or more LANs, radio access networks (RANs), metropolitan area networks (MANs), WANs, all or a portion of the global computer network known as the Internet, and/or any other communication system or systems at one or more locations.

In certain embodiments, business operations database 30, vulnerability store 34, and/or network model 32 may each comprise multiple independently managed federated memory stores such as a federated database for storing information used by cyber threat analysis tool 26. In this manner, business operations database 30, vulnerability store 34, and/or network model 32 operate with multiple autonomous memory stores and may allow administrators of individual segments of network infrastructure 16 to independently manage and control sensitive information generated and gathered throughout the collection, storage, and analysis of vulnerabilities on network model 32. Thus, administrators may independently generate their portion of business operations database 30, vulnerabilities store 34, and/or network model 32 and expose this information at a controlled level to users of cyber threat analysis tool for cyber threat analysis over the entire network infrastructure 16. Additionally, business operations database 30, vulnerability store 34, and/or network model comprising a federated memory store may provide an additional interface for normalizing data across disparate data sources whose format may not otherwise be easily interpreted and analyzed by cyber threat analysis tool 26.

Using federated memory stores, certain embodiments of cyber threat analysis tool 26 may simulate the effects of certain segments of network infrastructure 16 having differing levels of security relative to one another. For example, one federated memory store may be configured with a segment of a particular network infrastructure 16 having a 'top secret' security clearance, while another federated memory store may be configured with another segment having a differing security clearance, such as a 'secret' security clearance. Cyber threat analysis tool 26 may access information from one federated memory store in a systematic manner to identify and/or simulate cascading effects of either segment due to the resulting effects of attack vectors on the other segment of network infrastructure 16.

In operation, cyber threat analysis tool 26 generates a network model 32 of network infrastructure 16, assigns a weighting value to individual network elements 18 of network infrastructure 16 according to information stored in business operations database 30, and generates attack vectors associated with certain network elements 18. Using the generated attack vectors, cyber threat analysis tool 26 simulates the attack vectors on the network model to determine a criticality of the attack vector due to its impact upon services provided by network infrastructure 16.

Figure 2:
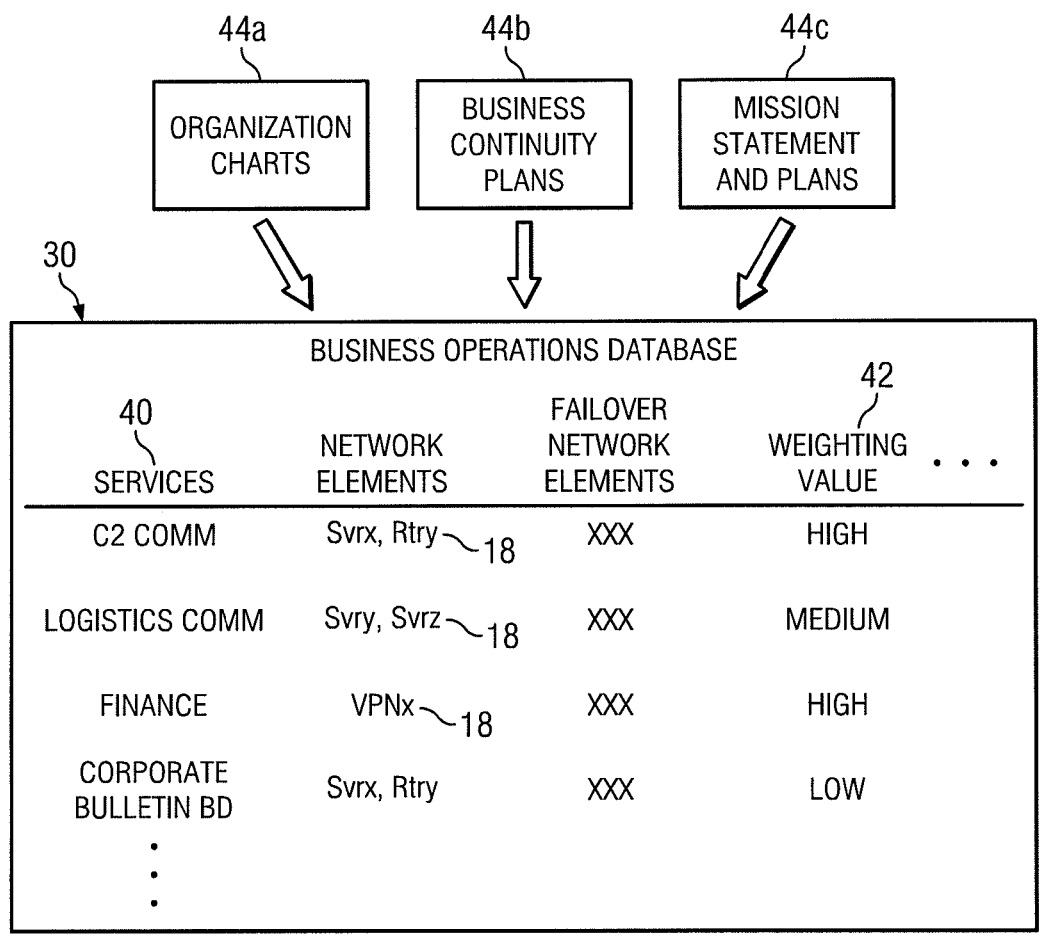
FIG. 2 illustrates an example business operations database that may be used by the cyber threat analysis tool of FIG. 1.

FIG. 2 illustrates an example business operations database 30 that may be used by the cyber threat analysis tool 26 of FIG. 1. Business operations database 30 includes several example entries representing several network services 40 provided by network infrastructure 16. The entries shown merely describe example services 40 that may be provided by a given network infrastructure 16. Certain embodiments may include entries representing additional, fewer, or other types of services that may be provided by network infrastructure 16.

Each service 40 may be associated with one or more network elements 18 in network infrastructure 16 that provide the corresponding service, any failover network elements 18, and a weighting value 42 associated with that service 40. Failover network elements 18 generally refer to any network elements 18 that may provide the given service in the event that network elements 18 are disabled. If for example, one or more network elements 18 are disabled due to a denial-of-service attack caused by a cyber attack vector, failover network elements 18 may begin providing the service. The weighting values 40 shown include values of 'low', 'medium', and 'high.' In certain embodiments, weighing values 40 may include any type that indicates a relative importance to the organization that uses network infrastructure 16.

The type and nature of services 40 may be determined according to the mission of the organization that uses network infrastructure 16. The mission of the organization generally refers to the business goals or other operations performed by the organization using network infrastructure 16. Those services 40 that are relatively important to the mission of the organization may therefore be assigned with a 'high' weighting value 42, while other services 40 that are relatively less important may be assigned with a lower weighting value 42, such as 'medium', or 'low.'

Organizations often have missions that differ from one another. This unique behavior may therefore, yield weighting values 40 that may be based upon operations of each organization and the configuration of their individual network infrastructure 16. In certain embodiments, services 40 and their associated weighting values 42 may be empirically determined from organizational data sources, such as organization charts 44a, mission statements and plans 44b, and/or risk assessments and business continuity plans 44c. For example, a user of cyber threat analysis tool 26 may obtain one or more of organization charts 44a, mission statements and plans 44b, and/or risk assessments and business continuity plans 44c associated with an organization that uses network infrastructure 16, determine suitable weighting values 42 for various services 40 provided by network infrastructure 16, and manually generate entries in business operations database 30 for use by cyber threat analysis tool 26.

Business continuity plans 44c generally refers to remedial actions to be taken on part of the organization due to failures of one or more network elements 18 of network infrastructure 16. For example, a particular file server may be used by an organization to store and provide documentation used for development of the organization's products. If the file server ceases to operate, development personnel therefore would be hampered from performing their assigned tasks. Thus, one remedial action would be to direct all ensuing traffic to a file server mirror in which files stored in file server are duplicated on a periodic basis. In a particular embodiment comprising a network infrastructure 16 managed by a governmental entity, business continuity plans may be referred to as continuity of operations.

Each service 40 may be associated with one or more network elements 18 that function to provide that service 40. Thus, if a particular network element 18 were to fail due to a denial-of-service attack, cyber threat analysis tool 26 may assign a criticality value associated with loss of that service 40 due to the denial-of-service attack.

Figure 3:
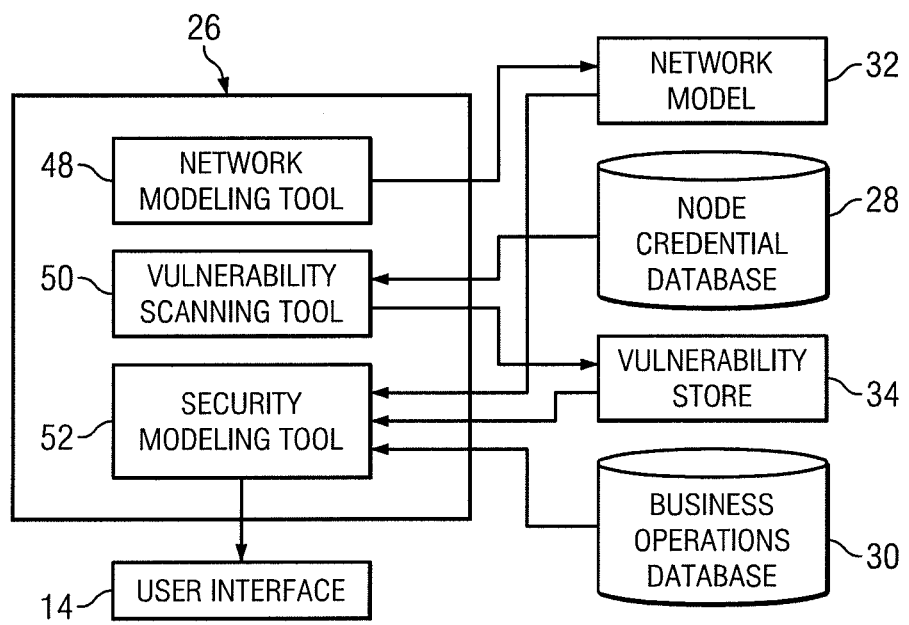
FIG. 3 illustrates an example cyber threat analysis tool according to certain embodiments of the cyber threat analysis system of FIG. 1.

FIG. 3 illustrates an example cyber threat analysis tool 26 according to certain embodiments of the cyber threat analysis system 10 of FIG. 1. Cyber threat analysis tool 26 includes a network modeling tool 48, a vulnerability scanning tool 50, and a security modeling tool 52. Although this particular implementation of cyber threat analysis system 10 is illustrated and primarily described, the present disclosure contemplates cyber threat analysis tool 26 having any suitable components, according to particular needs.

Network modeling tool 48 generates a network model of network infrastructure 16 that may be used for further analysis by cyber threat analysis tool 26. An example of a suitable network modeling tool includes an IP GURU NETWORK PLANNER™ and SYSTEMS GURU NETWORK PLANNER™ executable software packages available from Opnet Technologies Incorporated, located in Bethesda, Md. Network model 32 generated by network modeling tool 48 generally comprises a virtual representation of an actual network infrastructure 16 that may include one or more networks 20 and any associated network elements 18. Certain embodiments of network modeling tool 48 may provide hypothetical analysis for vulnerabilities in network infrastructure 16. That is, hypothetical (non-empirically determined) attack vectors and/or variant configurations of network infrastructure 16 may be created and tested on network model 32 in a relatively quick and efficient manner.

Particular embodiments of the present disclosure may provide one or more technical advantages. For example, certain embodiments of cyber threat analysis system 10 may provide analysis of network infrastructure 16 without potential damage to network infrastructure 16 or the organization that uses it. Analysis of production network infrastructures 16 may be difficult to test with attack vectors due to the damage these attack vectors may cause to the network infrastructure 16 and/or the organization that uses the network infrastructure 16. By analyzing attack vectors on a network model 32 of network infrastructure 16, cascading vulnerabilities and their resulting ramifications may be identified without potential damage to the network infrastructure 16 or the organization that uses the network infrastructure 16. Thus, certain embodiments of cyber threat analysis system may provide relatively more thorough analysis than would otherwise be provided by conventional vulnerability analysis tools.

Vulnerability scanning tool 50 may include any software tool that detects vulnerabilities in network infrastructure 16 and stores the detected vulnerabilities in vulnerability store 34. One example of a suitable vulnerability scanning tool is the NESSUS™ software application available from Tenable Network Security, Inc., located in Columbia, Md. Vulnerability scanning tool 50 may use both privileged and non-privileged access to assess the security state of a system being tested. Non-privileged access generally refers to a scanning technique used by vulnerability scanning tool 50 to scan network infrastructure 16 without administrative privileges such that vulnerability scanning tool 50 may return external vulnerabilities of network infrastructure 16. Privileged access generally refers to administrative privileges accessed via node credential database 28 to determine internal vulnerabilities of network infrastructure 16.

Security modeling tool 52 generates attack vectors according to vulnerabilities stored in vulnerability store 34 and configuration of network infrastructure 16 stored in network model 32. For example, vulnerability scanning tool 50 may have detected a particular vulnerability on a certain network element 18 of network infrastructure 16. Given this vulnerability, security modeling tool 52 may generate an attack vector that may be used to simulate this vulnerability on the certain network element 18. An example of a suitable type of network security modeling tool is the SKYBOX™ software application available from Skybox Security Incorporated, which is located in San Jose, Calif.

Security modeling tool 52 applies generated attack vectors into network model 32 and determines one or more ramifications resulting from the attack vector. These ramifications may be combined with weighting values 42 from business operations database 30 to derive a criticality value for the attack vector that may be displayed on user interface 14.

Figure 4:
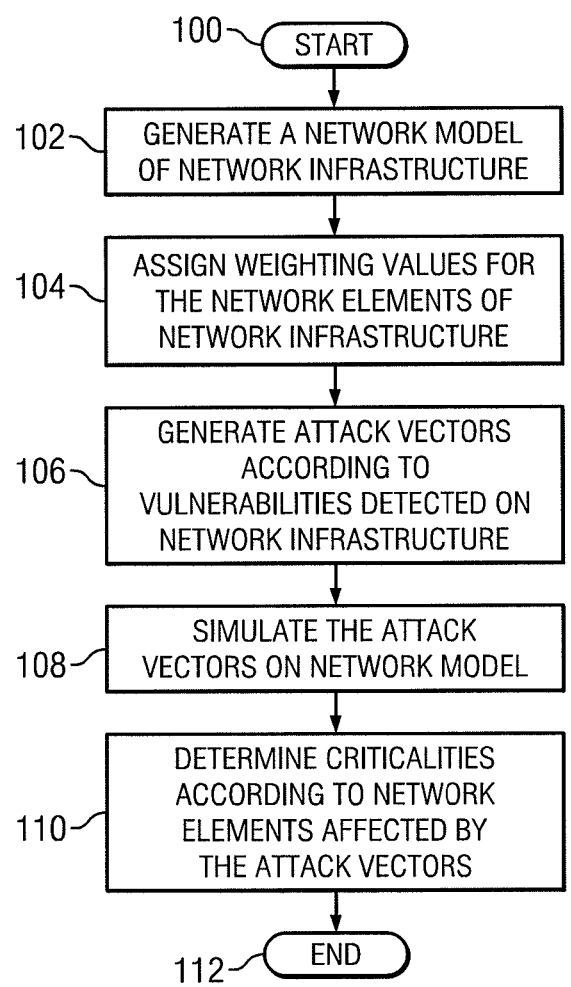
FIG. 4 illustrates an example method for analyzing vulnerabilities in a network infrastructure according to certain embodiments of the present disclosure.

FIG. 4 illustrates an example method for analyzing vulnerabilities in a network infrastructure 16, according to certain embodiments of the present disclosure. In act 100, the process is initiated.

In act 102, cyber threat analysis tool 26 generates a network model 32 of a network infrastructure 16 to be analyzed. In certain embodiments, cyber threat analysis tool 26 may include a network modeling tool 48 that generates the network model 32 and provides input stimuli for simulating various networking scenarios on network model 32.

In act 104, cyber threat analysis tool 26 assigns weighting values for the network elements 18 of network infrastructure 16 according to their importance to the organization that uses network infrastructure 16. The weighting values may then be stored in business operation database 30. In certain embodiments, the weighting values may be manually determined from organizational data sources of the organization, such as organization charts 44a, mission statements and plans 44b, and/or risk assessments and business continuity plans 44c. In certain embodiments, the weighting values may be automatically determined using computer executed algorithms that generate the weighting values according to certain elements of organizational data sources, such as those described above.

In act 106, cyber threat analysis tool 26 generates one or more attack vectors according to vulnerabilities detected on network infrastructure 16. In certain embodiments, cyber threat analysis tool 26 may include a vulnerability scanning tool 50 that analyzes network infrastructure 16 to determine external or internal vulnerabilities, and a network modeling tool 48 to generate attack vectors from the determined vulnerabilities. External vulnerabilities generally refer to vulnerabilities of network infrastructure 16 that may be accessed externally from network infrastructure 16 using network elements 18 having external access, such as gateways, border routers, firewalls, and the like. Internal vulnerabilities generally refer to vulnerabilities that may exploit non-externally accessed network elements 18. Whereas internal vulnerabilities may be determined via use of administrative privileges received from node credential database 28, external vulnerabilities may be determined by cyber threat analysis tool 26 without administrative privileges.

In act 108, cyber threat analysis tool 26 simulates the attack vectors on network model 32 to determine one or more resulting ramifications on network elements 18 due to the effects of the attack vectors. For example, cyber threat analysis tool 26 may inject a particular attack vector into network model 32 such that one or more network elements 18 are disabled. In some cases, services 40 provided by the disabled network elements 18 may also be provided by failover network elements 18 such that these services continue to function. In other cases, no failover network elements 18 are provided such that the service 40 caused by the simulated attack vector is no longer available. In either case, the simulated attack vector may yield useful information associated with the functions of network elements 18 in response to vulnerabilities.

In act 110, cyber threat analysis tool 26 determines criticalities associated with the attack vector according to the weighting factors of network elements 18 affected by the injected attack vectors. Criticalities may include any proportional value that associates the relative severity of the attack vector to the organization that use network infrastructure 16. In certain embodiments, criticalities may include other aspects of services provided by network infrastructure 16 to the organization, such as, but not limited to, a monetary costs to the organization, a level of breached security of the organization, a reduced performance of network infrastructure 16, downtime of one or more of the network elements 18, and/or downtime of one or more services provided by the network infrastructure 16.

In certain embodiments, the determined criticality values may be used to estimate monetary costs that may be incurred by the organization due to the effects of the attack vector. For example, a particular network infrastructure 16 may include a sub-network 20 incorporating services 40 for providing financial management for payments and/or receipts for services rendered or products provided by service personnel and/or customers, respectively. Criticality values determined by cyber threat analysis tool 26 may be used to determine an estimated downtime, and other factors associated with restoring operation of the sub-network that manages financial services from which an estimated monetary cost to the organization due to a cyber attack may be determined.

In a concrete example, a particular network infrastructure 16 includes a sub-network 20 that communicatively couples a number of network elements 18 with one another for administering payments of payable accounts of an organization that uses the particular network infrastructure 16. In the event of a network outage or degradation of performance of the sub-network or any of its network elements 18, however, certain payable accounts may be rendered unpaid. The cascading effects of this unrendered payment may therefore result in a lapse in services provided by unpaid service personnel and/or halted shipment of products otherwise provided by product providers of the organization. Thus, a monetary value associated with the lapse in services or halted shipment of products may be associated with cyber attacks upon network infrastructure 16. Certain embodiments, therefore, may provide an estimated cost to the organization due to one or more cascading effects of cyber attacks on the network infrastructure 16 used by the organization.

In certain embodiments, the determined criticalities may be used to determine performance ramifications to network infrastructure 16 due to effects of attack vectors. For example, a particular portion of network infrastructure 16 may provide communication services for the organization. Although the communication services may incorporate a failover scheme such that a failure of a particular network element 18 causes the communication services to switch to other redundant network elements 18, these other redundant network elements 18 may execute the communication services with a lower level of performance. Thus, criticality values provided by cyber threat analysis tool 26 may be used to estimate a degradation in performance incurred by services executed on network elements 18 affected by attack vectors.

Furthermore, in certain embodiments, the determined criticalities may be used to estimate cascading effects on network infrastructure 16 due to the effects of attack vectors on network infrastructure 16. For example, a particular network element 18 may function as a redundant network element 18 for certain services such that a failure of the primary network element 18 on which the services are executed causes execution of the services to commence on the redundant network element 18. Execution of the services on the redundant network element 18, however, may incur an increased load on the redundant network element 18 such that other services provided by the redundant network element 18 may suffer. Thus, cyber threat analysis tool 26 may associate certain cascading effects with attack vectors and use weighting values associated with services 40 provided by network infrastructure 16 to estimate criticality values for attack vectors.

The process described above may be performed for each vulnerability identified by vulnerability scanning tool 50. In certain embodiments, the process described above may also be performed for hypothetical vulnerabilities that may also be referred to as 'what-of analysis.' Hypothetical vulnerabilities generally refer to a particular cyber attack scenario that may be manually generated by a user of cyber threat analysis tool 26. In some cases, the hypothetical vulnerability may be generated according to known aspects of previous cyber attacks and/or resulting ramifications to networks caused by these cyber attacks. Using cyber threat analysis tool 26, the hypothetical vulnerability may be simulated on network model 32 to characterize a hypothetical scenario to determine the severity of the cyber attack and the resulting effects of the cyber attack on network infrastructure 16.

In act 112, the process ends.

Although the present disclosure has been described with several embodiments, a myriad of changes, variations, alterations, transformations, and modifications may be suggested to one skilled in the art, and it is intended that the present disclosure encompass such changes, variations, alterations, transformation, and modifications as they fall within the scope of the appended claims.

What is claimed is:

1. A system comprising:
   one or more memory units;
   one or more processing units operable to:
   generate a network model of a network infrastructure that is used by an organization;
   assign a business weighting value to each of a plurality of network elements of the network infrastructure according to a relative business importance of the each network element to the organization;
   generate an attack vector associated with at least one network element of the plurality of network elements according to a determined vulnerability of the network infrastructure, the attack vector representing one or more illicit actions that may be performed to compromise the network infrastructure;
   simulate, using a network modeling tool, the attack vector on the network model to determine one or more resulting ramifications of one or more network elements of the plurality of network elements due to the attack vector; and
   determine a criticality level of the attack vector associated with the at least one network element, the determining including combining the business weighting values assigned to the one or more network elements with the one or more resulting ramifications of the one or more network elements as determined from the simulating, the criticality level including monetary cost to the organization; and
   a first storage and a second storage, the first storage operable to store a plurality of the weighting values that are assigned to corresponding ones of the plurality of network elements and the second storage operable to store at least the determined vulnerability, wherein the first storage, the second storage, and the network model comprise a plurality of federated memory stores so as to simulate effects of one or more network elements of the plurality of network elements in a first segment of the network infrastructure having a different level of security relative to another network element of the plurality of network elements in a second segment of the network infrastructure.

2. The system of claim 1, wherein the one or more processing units are operable to generate the attack vector from a vulnerability determined by a vulnerability scanning tool, the vulnerability representing a security weakness of the network infrastructure.

3. The system of claim 2, wherein the vulnerability comprises an external vulnerability, the vulnerability scanning tool operable to perform a discovery operation to determine the external vulnerability.

4. The system of claim 2, further comprising a node credential database including administrative privileges for the plurality of network elements, the vulnerability scanning tool operable to:
   receive one or more administrative privileges for the at least one network element; and
   determine an internal vulnerability of the at least one network element using the administrative privileges of the at least one network element, the internal vulnerability comprising the vulnerability.

5. The system of claim 1, wherein the one or more processing units are operable to:
   generate the attack vector using a network security modeling tool.

6. The system of claim 1, wherein the criticality level further comprises one or more of the following:
   a level of breached security of the organization;
   reduced performance of the network infrastructure;
   downtime of one or more of the network elements; and
   downtime of one or more services provided by the network infrastructure.

7. The system of claim 1, wherein the attack vector comprises one or more hypothetical vulnerabilities.

8. The system of claim 1, wherein the one or more processing units are operable to display the criticality level via a display.

9. The system of claim 1, wherein the at least one network element comprises a first network element and the one or more network elements comprises a second network element different from the first network element.

10. A method comprising:
   generating a network model of a network infrastructure that is used by an organization;
   assigning a business weighting value to each of a plurality of network elements of the network infrastructure according to a relative importance of the each network element to the organization;
   generating an attack vector associated with at least one network element of the plurality of network elements according to a determined vulnerability of the network infrastructure, the attack vector representing one or more illicit actions that may be performed to compromise the network infrastructure;
   simulating, using a network modeling tool, the attack vector on the network model to determine one or more resulting ramifications of one or more network elements of the plurality of network elements due to the attack vector;
   determining, using one or more processors, a criticality level of the attack vector associated with the at least one network element, the determining including combining the business weighting values assigned to the one or more network elements with the one or more resulting ramifications of the one or more network elements as determined from the simulating, the criticality level including monetary cost to the organization;
   assigning a plurality of weighting values to corresponding ones of the plurality of network elements;
   storing the plurality of weighting values in a first storage; and
   storing at least the determined vulnerability in a second storage, wherein the first storage, the second storage, and the network model comprise a plurality of federated memory stores so as to simulate effects of one or more network elements of the plurality of network elements in a first segment of the network infrastructure having a different level of security relative to another network element of the plurality of network elements in a second segment of the network infrastructure.

11. The method of claim 10, wherein generating the attack vector further comprises generating the attack vector from a vulnerability determined by a vulnerability scanning tool, the vulnerability representing a security weakness of the network infrastructure.

12. The method of claim 11, further comprising:
   performing a discovery operation to determine the vulnerability, the vulnerability comprising an external vulnerability.

13. The method of claim 11, further comprising:
   receiving administrative privileges for the at least one network element; and
   determining an internal vulnerability of the at least one network element using the administrative privileges of the at least one network element, the internal vulnerability comprising the vulnerability.

14. The method of claim 10, wherein the one or more processors are operable to:
   generate the attack vector using a network security modeling tool.

15. The method of claim 10, wherein the criticality level further comprises one or more of the following:
   a level of breached security of the organization;
   reduced performance of the network infrastructure;
   downtime of one or more of the network elements; and
   downtime of one or more services provided by the network infrastructure.

16. The method of claim 10, wherein the attack vector comprises one or more hypothetical vulnerabilities.

17. Software embodied in a non-transitory computer-readable medium, the software when executed by one or more processing units operable to perform operations comprising:
   generating a network model of a network infrastructure that is used by an organization;
   assigning a business weighting value to each of a plurality of network elements of the network infrastructure according to a relative importance of the each network element to the organization;
   generating an attack vector associated with at least one network element of the plurality of network elements according to a determined vulnerability of the network infrastructure, the attack vector representing one or more illicit actions that may be performed to compromise the network infrastructure;
   simulating, using a network modeling tool, the attack vector on the network model to determine one or more resulting ramifications of one or more network elements of the plurality of network elements due to the attack vector;
   determining a criticality level of the attack vector associated with the at least one network element, the determining including combining the business weighting values assigned to the one or more network elements with the one or more resulting ramifications of the one or more network elements as determined from the simulating, the criticality level including monetary cost to the organization;
   storing a plurality of the weighting values that are assigned to corresponding ones of the plurality of network elements in a first storage; and
   storing at least the determined vulnerability in a second storage, wherein the first storage, the second storage, and the network model comprise a plurality of federated memory stores so as to simulate effects of one or more network elements of the plurality of network elements in a first segment of the network infrastructure having a different level of security relative to another network element of the plurality of network elements in a second segment of the network infrastructure.

18. The software of claim 17, further comprising a vulnerability scanning tool, the vulnerability scanning tool operable to identify a vulnerability in the network infrastructure, and generate the attack vector from the identified vulnerability.

19. The software of claim 18, wherein the vulnerability comprises an external vulnerability, the vulnerability scanning tool operable to perform a discovery operation to determine the external vulnerability.

20. The software of claim 18, wherein the vulnerability scanning tool is operable to:
   receive administrative privileges for the at least one network element; and
   determine an internal vulnerability of the at least one network element using the administrative privileges of the at least one network element, the internal vulnerability comprising the vulnerability.

21. The software of claim 17, further comprising a network security modeling tool, the network security modeling tool operable to generate the attack vector.

22. The software of claim 17, wherein the criticality level further comprises one or more of the following:
   a level of breached security of the organization;
   reduced performance of the network infrastructure;

downtime of one or more of the network elements; and
downtime of one or more services provided by the network infrastructure.

23. The software of claim 17, wherein the attack vector comprises one or more hypothetical vulnerabilities.

\* \* \* \* \*

UNITED STATES PATENT AND TRADEMARK OFFICE
CERTIFICATE OF CORRECTION

| | | |
|---|---|---|
| PATENT NO. | : 8,601,587 B1 | Page 1 of 2 |
| APPLICATION NO. | : 12/875854 | |
| DATED | : December 3, 2013 | |
| INVENTOR(S) | : Powell et al. | |

It is certified that error appears in the above-identified patent and that said Letters Patent is hereby corrected as shown below:

On the Title Page, item (56)

On page 2, in column 1, under "Other Publications", line 9, delete "revision" and insert --Revision--, therefor On page 2, in column 1, under "Other Publications", line 12, delete "( Revision 2)" and insert --(Revision 2)--, therefor On page 2, in column 2, under "Other Publications", line 8, delete "pg" and insert --pgs--, therefor On page 2, in column 2, under "Other Publications", line 11, delete "pg" and insert --pgs--, therefor On page 2, in column 2, under "Other Publications", line 36, delete "W.Y." and insert --W. Y.--, therefor In the Drawings On Sheet 2 of 3, Fig. 2, reference numeral 44b, delete "44b" and insert --44c--, therefor On Sheet 2 of 3, Fig. 2, reference numeral 44c, delete "44c" and insert --44b--, therefor In the Specification In column 2, line 48, delete "stores" and insert --store--, therefor In column 6, line 7, delete "16." and insert --26.--, therefor Signed and Sealed this
Fifth Day of August, 2014

Michelle K. Lee
*Deputy Director of the United States Patent and Trademark Office*

CERTIFICATE OF CORRECTION (continued)
U.S. Pat. No. 8,601,587 B1

In column 6, line 59, after "tool", insert --26--, therefor

In column 6, line 62, after "model", insert --32--, therefor

In column 8, line 67, after "system", insert --10--, therefor

In column 10, line 58, before "or", insert --20--, therefor